H. P. CHAMBERLAIN.
OBTAINING MOTOR SPIRIT AND BURNING OIL FROM HIGHER BOILING PETROLEUM.
APPLICATION FILED AUG. 17, 1916.
1,400,419. Patented Dec. 13, 1921.
4 SHEETS—SHEET 1.
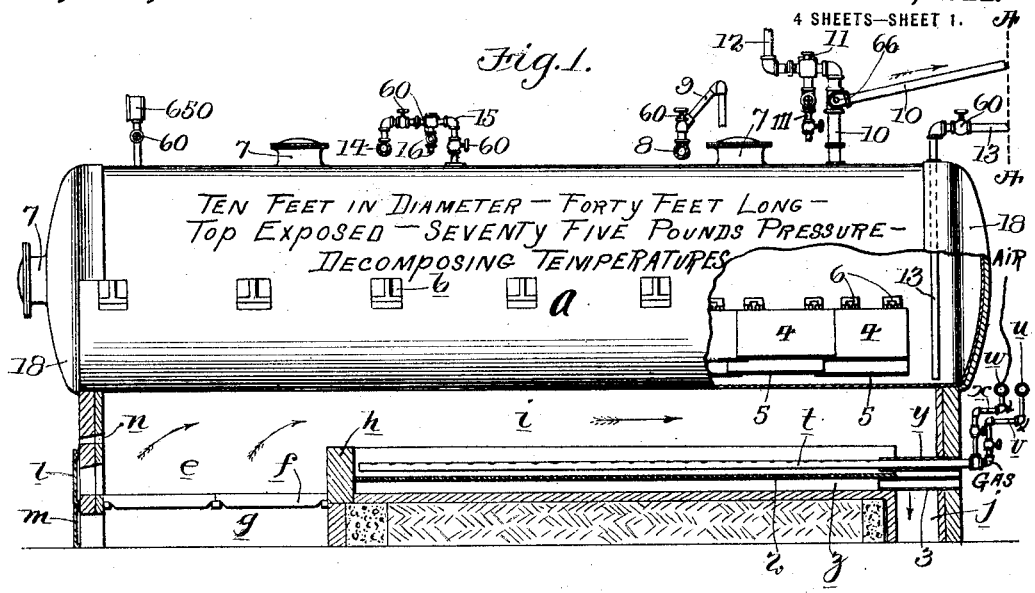
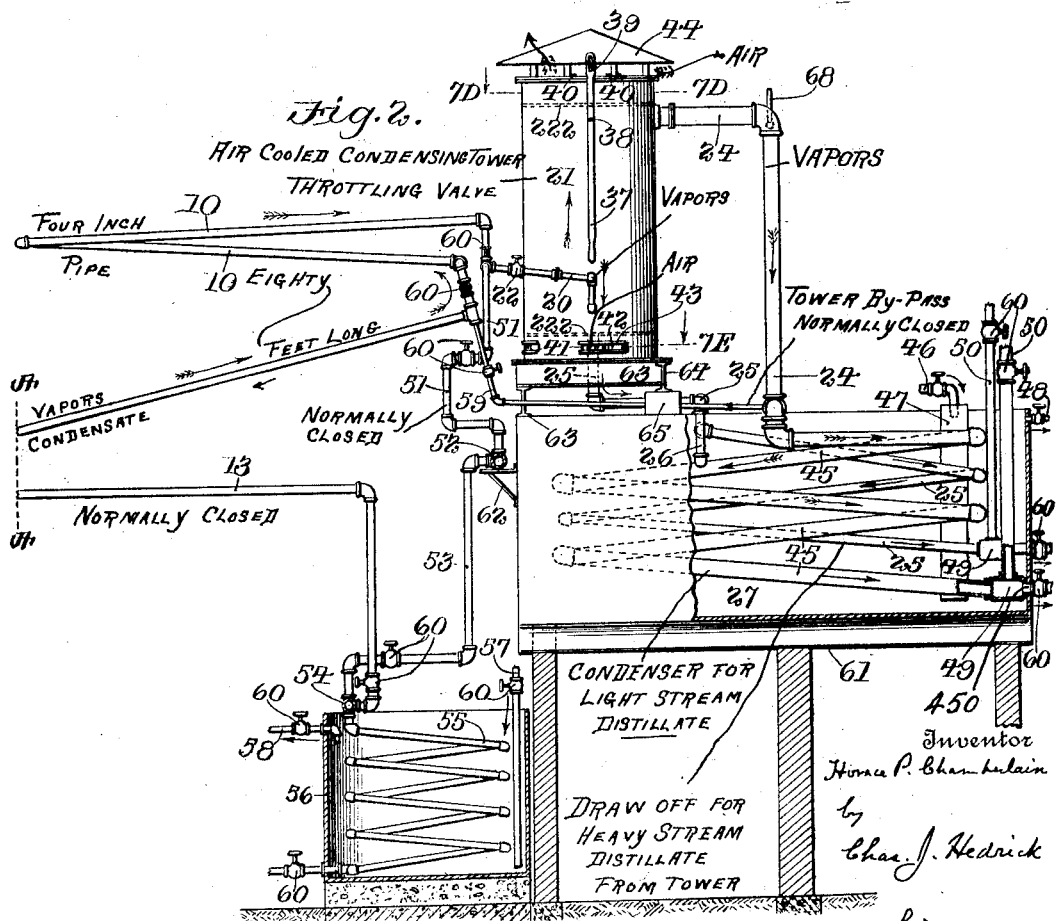

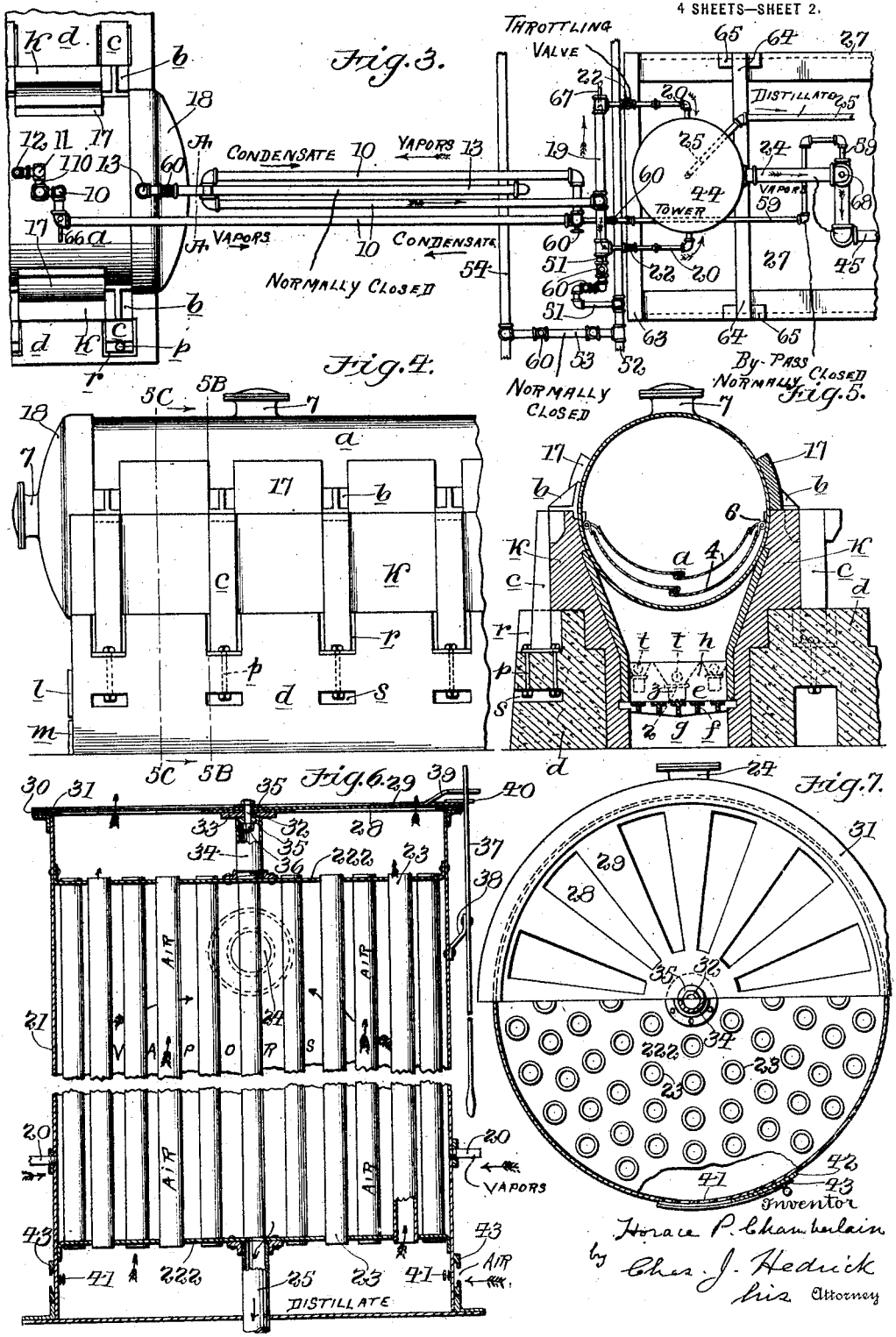

H. P. CHAMBERLAIN.
OBTAINING MOTOR SPIRIT AND BURNING OIL FROM HIGHER BOILING PETROLEUM.
APPLICATION FILED AUG. 17, 1916.
1,400,419.
Patented Dec. 13, 1921.
4 SHEETS—SHEET 3.
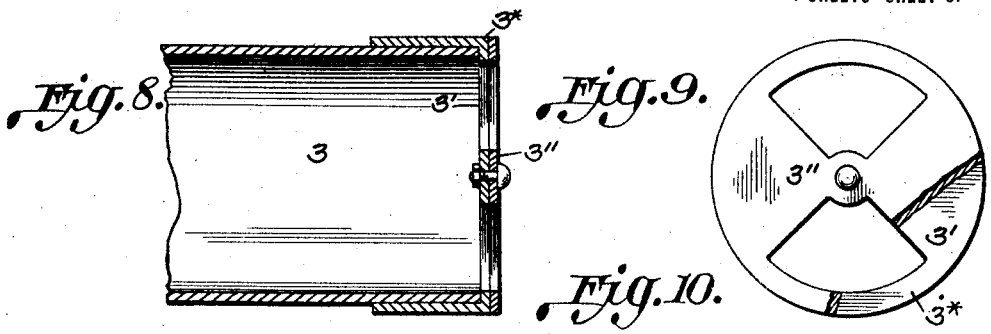
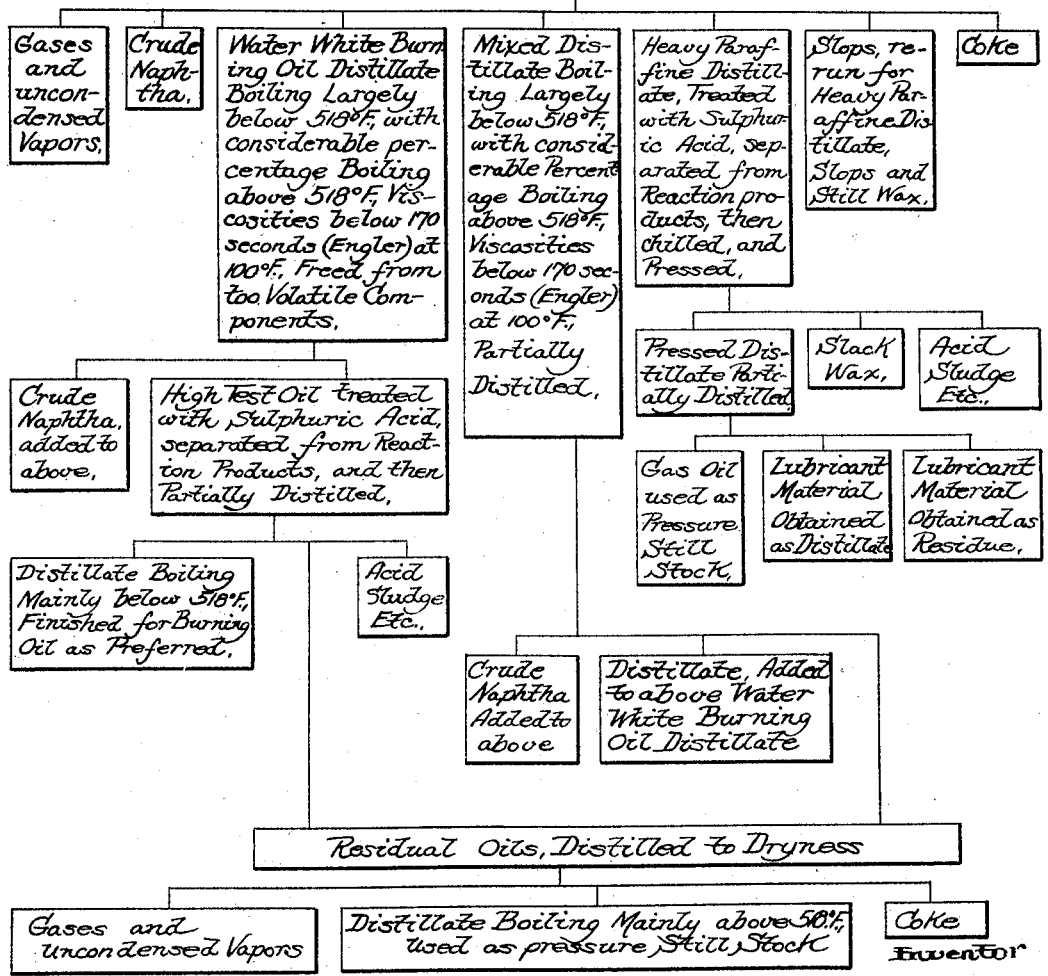

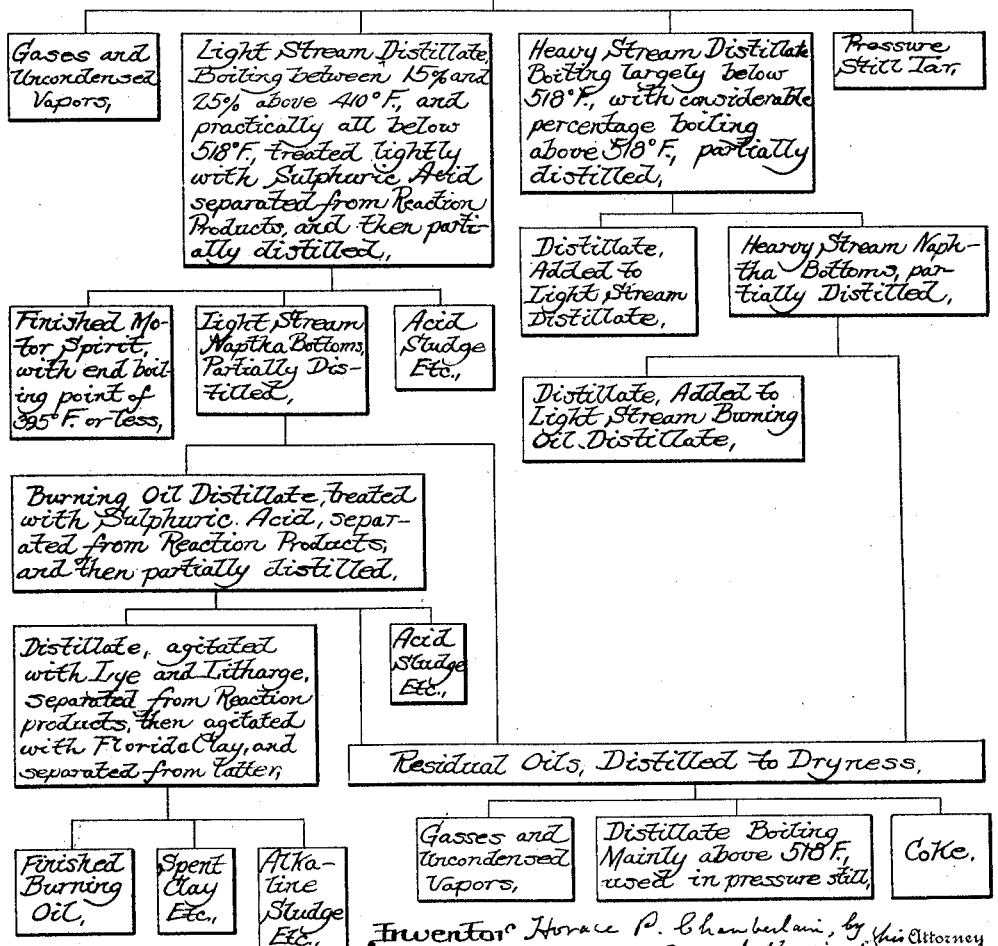

UNITED STATES PATENT OFFICE.

HORACE P. CHAMBERLAIN, OF BUFFALO, NEW YORK, ASSIGNOR TO STANDARD OIL COMPANY OF NEW YORK, OF NEW YORK, N. Y., A CORPORATION OF NEW YORK.

OBTAINING MOTOR-SPIRIT AND BURNING-OIL FROM HIGHER-BOILING PETROLEUM.

1,400,419.     Specification of Letters Patent.     Patented Dec. 13, 1921.

Application filed August 17, 1916. Serial No. 115,512.

*To all whom it may concern:*

Be it known that I, HORACE P. CHAMBERLAIN, a citizen of the United States, residing at Buffalo, in the county of Erie and State of New York, have invented certain new and useful Improvements in Obtaining Motor-Spirit and Burning-Oil from Higher-Boiling Petroleum, of which the following is a specification.

This invention relates more particularly to processes and apparatus whereby (1) motor spirit for use in explosive engines and (2) burning oil (kerosene) for combustion in lamps with wicks can be obtained by operations which include the decomposition of hydrocarbons that have boiling points above 518° F. (270° C.) Each of the improvements however which compose the invention is intended to be secured for all the uses to which it may be applicable, severally or in combination and with or without modification.

Hydrocarbons with boiling points intermediate 302° F. and 518° F. (150° C. to 270° C.) are regarded herein as normal to burning oil (kerosene). Motor spirit consists mainly of hydrocarbons with boiling points below 302° F.; but it also contains some higher boiling hydrocarbons. It is important that it should be volatile in its entirety below a prescribed temperature. This temperature may vary according to the grade of the product. At the present time a motor spirit would be merchantable if a sample thereof, subjected to a distillation assay in the customary way by means of a laboratory flask with side tube and a thermometer whose bulb is located in the flask neck just below said side tube, should all pass off when or before say 395° F. is attained; so that no appreciable quantity of oil should then remain in the assay flask. Percentages given herein for liquids are by volume unless percentage by weight should be stated.

The following procedure may well be employed in order to carry the invention into effect in a form which embodies (by way of example) all of the improvements which compose said invention.

First. Petroleum in the crude form in which it is produced at the wells, after separation of water and earthy matter by settling and decantation, is distilled in any known or suitable way with collection (besides other distillates) of one or more distillates, such as the customary water white burning oil (kerosene) distillate and the succeeding mixed naphtha-burning-oil-gas-oil distillate, which consist largely of hydrocarbons with boiling points below 518° F., but which also contain a considerable percentage at least of those with boiling points above 518° F. and which are free (at least practically) from hydrocarbons with viscosities normal for medium and heavy grades of lubricants. The minimum viscosity of hydrocarbons normal for medium lubricants may be taken at one hundred and seventy seconds at 100° F. by an Engler viscosimeter, with which water would exhibit a viscosity of fifty three seconds at 100° F.

Second. Such distillates (best after treatment of the same with sulfuric acid and separation of reaction products from the treated oil, but it may be without such treatment) are distilled (rerun) to dryness or as near thereto as preferred, in any known or suitable way with collection separately of distinct distillates (twice run oils), one (at least) composed mainly of hydrocarbons with boiling points below 518° F. and one other (at least) composed mainly of hydrocarbons with boiling points above 518° F.

Third. The heavier of these twice run oils is subjected (by itself or in admixture with other appropriate oil) to distillation at decomposing temperatures under superatmospheric pressure of more than thirty pounds, best about seventy-five pounds per square inch. In the run hereinafter more particularly described, these temperatures ranged from 696° F. to 736° F., average about 713° F.

Fourth. In this high pressure distillation the oil operated upon is appropriately heated in a compact body (say with an original volume of about five thousand gallons as a minimum) in a still of appropriate size and strength (say with a capacity of about one thousand cubic feet as a minimum and of a strength to withstand at said decomposing temperatures, with a proper margin of safety, said internal pressure of more than thirty pounds per square inch above atmospheric pressure), which still has its top exposed to the atmosphere to the extent of about one-third of its periphery in order that partial condensation of the evolved vapors may take place in the vapor space overlying the oil in distillation in what is regarded as the best proportion to be effected within the still. In effecting this partial condensation the evolved vapors may be cooled about 150° F., more or less, say between one hundred degrees F. and two hundred degrees F. below the contemporaneous temperatures of the oil in distillation. Preferably a still of horizontal cylindrical form with a capacity of upward of three thousand cubic feet would be used; and the stock charged into such a still would best have an original volume of upward of fifteen thousand gallons.

Fifth. The condensate so formed within the vapor space of the still is returned to the oil in distillation.

Sixth. The uncondensed vapors pass out of the still and are cooled in the form of a single upwardly inclined stream, less than six inches in diameter, elongated to more than one hundred times its diameter, and best exemplified by a four-inch stream eighty feet long when a body of petroleum with an original volume of about fifteen thousand gallons is distilled as aforesaid.

Seventh. The heat conducting walls inclosing said stream (or streams) of vapors would best have an area of air cooled surface equal to about twenty per cent. (say between ten per cent. and thirty per cent.) of the exposed area of the still top; and the cubic contents of the space occupied by said stream (or streams) would best be less than one and a half per cent. of the original volume of the still charge which would correspond with less than one per cent. of the cubic contents of the still; since normally the still would be filled about six-tenths full at the beginning of a run. The vapors may well be cooled therein about 90° F., more or less, say between forty degrees F. and one hundred and forty degrees F. below the contemporaneous temperatures of the vapors leaving the still.

Eighth. The condensate formed from said stream flows under and in contact with the oppositely flowing vapors and is returned to the oil in distillation after thus affording an extended opportunity for interchange of hydrocarbons between itself and the vapors.

Ninth. By cooling the evolved vapors first in the still and then in the outside upwardly inclined stream said vapors are reduced in temperature so far below 550° F. (287.8° C.) that hydrocarbons with boiling points above 518° F. (270° C.) compose at most not more than about twenty five per cent. (measured in liquid state) of the vapors passing onward and so far above 410° F. (210° C.) that upward of thirty five per cent. of hydrocarbons with boiling points above 410° F., including at least an appreciable amount of said hydrocarbons with boiling points above 518° F., are contained in said vapors. Thus, if a sample of the total oil obtainable in a run from condensing said vapors in an ordinary water cooled condenser under atmospheric pressure should be subjected to a distillation assay, upward of thirty five per cent. of the sample will remain in the assay flask at 410° F. and an appreciable quantity, but not so much as twenty five per cent., when 518° F. is attained. In the run hereinafter more particularly described, wherein the vapors passing onward from said upwardly inclined stream had the composition just mentioned, the temperatures of the same at this point ranged from about 432° F. to about 498° F., average about 465° F.

I have discovered that when the formation of condensate to be returned to the oil in distillation is thus restricted there are for equal volumes of like oil operated upon, (1) less formation of coke in the still, (2) less consumption of fuel, (3) less danger of overheating the still bottom, and (4) less wear and tear generally on the still than there would be were a larger proportion of the evolved vapors to be so returned; while at the same time the proportion of distillate obtainable by condensation of the then remaining vapors is enough larger and the quality of such distillate sufficiently good to make the yield of motor spirit of a given grade little inferior (if not, in fact, equal or superior) to that obtained with said larger return of condensate to the oil in distillation.

On the other hand, should the formation of condensate for return to the oil in distillation be substantially more restricted a smaller amount of hydrocarbons, available for use in motor spirit of a given grade, would be formed in the still; and the yield of such motor spirit would consequently be reduced.

In this connection it is to be observed that the amount of such so available hydrocarbons does not necessarily always increase when the evolved vapors are cooled for formation of a larger proportion of return condensate. My experience tends to show that it may sometimes at least decrease; and it is well, therefore, to adjust the cooling agencies accordingly.

Tenth. The vapors that pass onward are partially condensed by bringing them into contact with the walls of numerous parallel cooling pipes so arranged that said walls are interposed between currents of said vapors and of aeriform cooling fluid flowing the former over the outside and the latter through the interior of said pipes; or conversely.

Eleventh. The conditions of partial condensation are so adjusted that the vapors which remain uncondensed therein are at least practically free from hydrocarbons with boiling points above 518° F. and at the same time have a content of between about fifteen per cent. and about twenty-five per cent. (measured in liquid state) of hydrocarbons with boiling points above 410° F. In the run hereinafter more particularly described, wherein the said uncondensed vapors had the composition just mentioned, the temperatures of the same at this point ranged from about 267° F. to about 390° F., average about 341° F.

Twelfth. The condensate formed by said partial condensation is drawn off as distillate. It is hereinafter called the heavy stream distillate or simply the heavy stream.

Thirteenth. The vapors then remaining uncondensed are separately condensed by further cooling; and the so obtained condensate is drawn off as a distinct distillate. It is hereinafter called the light stream distillate, or simply the light stream. The total of it collectible in a run would contain almost (if not quite) all of the distillate hydrocarbons with boiling points below 302° F.; while at the same time its content of higher boiling hydrocarbons would be sufficiently limited in range and proportion for obtaining, by a single subsequent distillation thereof, a good yield of motor spirit which would all of it distil over below a given merchantable temperature.

Were either hydrocarbons with boiling points above 518° F. in considerable proportion, or an excessive percentage of hydrocarbons with boiling points above 410° F., to be present in said light stream, the amount of motor spirit of a given grade, obtainable therefrom by a single distillation, would be diminished. Moreover, and especially if a large proportion of hydrocarbons with boiling points above 518° F. were present in said light stream, increased expenses would be incurred for fuel, plant, sulfuric acid and other chemical reagents in operating upon said light stream as hereinafter set forth.

On the other hand, were the percentage of hydrocarbons in said light stream with boiling points above 410° F. to be unduly restricted by condensation of a larger part of the distillate vapors more of the total hydrocarbons in these vapors with boiling points below 302° F. would enter the heavy stream of distillate; and the expense of getting them eventually into the motor spirit would be increased.

Fourteenth. The distillate, so obtained as the light stream, is subjected to a mild treatment with sulfuric acid; that is to say, it is agitated with sulfuric acid insufficient in strength or in quantity to refine the heavier hydrocarbons thereof suitably for burning oil; but the acid employed may be, and best would be, sufficient to refine the lighter hydrocarbons suitably for the use intended, as, for example, for motor spirit.

Fifteenth. The acid treated oil is separated from the reaction products in any known or suitable way, as, for example, by the successive operations of (a) settling, (b) decanting, (c) washing with water, (d) agitation with caustic soda lye, (e) settling, (f) decanting, and (g) final washing with water, all in the customary manner of performing those operations in petroleum refineries.

Sixteenth. The so separated oil is distilled as long as the distillate is satisfactory for motor spirit (or such other light product as may be desired). The so obtained distillate may be a finished merchantable article; or it may be (according to the case) in condition to require further refining.

Seventeenth. The residual portion of the light stream (herein called light stream naphtha bottoms for convenience of reference) is distilled say as long as the distillate is of satisfactory quality for burning oil in view of subsequent operations to be performed on said distillate.

Eighteenth. The so obtained distillate (herein called light stream burning oil distillate) is treated with sulfuric acid; and the so treated oil is separated from reaction products.

Nineteenth. The so separated oil is distilled to such extent as may be desired.

Twentieth. The so obtained distillate is finished for burning oil (kerosene), it may be, in any known or suitable way, with or without (best without) further treatment with sulfuric acid, say by subjecting it (1) to the well known Canadian treatment, which consists in (a) agitation with caustic soda lye and litharge followed by (b) settling, (c) decanting, and (d) washing with water, and afterward (2) to a treatment in the known way with Florida clay (fuller's earth) or the like by (a) agitation, (b) settling, and (c) decanting; or the oil can be filtered through Florida clay or the like.

Twenty first. The residue of the light stream naphtha bottoms, after separation of burning oil distillate therefrom, is distilled to dryness, or to the desired extent short of dryness; and the so obtained distillate is utilized as pressure still stock, being supplied to a suitable still for distillation therein under the high pressure herein above mentioned.

Twenty second. The residue obtained in rerunning the light stream burning oil distillate is distilled to dryness, or to the desired extent short of dryness; and the so obtained distillate is utilized as pressure still stock.

Twenty third. The heavy stream is distilled as long as the distillate is satisfactory for motor spirit (or whatever light product is manufactured) in view of subsequent operations to which said distillate is to be subjected.

Twenty fourth. The so obtained distillate (light end of heavy stream) is operated upon for motor spirit (or other light product), burning oil distillate and pressure still stock as herein above described for the light stream.

Twenty fifth. The residual portion of the heavy stream (after removal of its said light end) is distilled as long as the distillate is satisfactory for burning oil (kerosene) in view of subsequent operations to which said distillate is to be subjected; and the so obtained heavy stream burning oil distillate is operated upon for burning oil (kerosene) and pressure still stock as herein above described for the light stream burning oil distillate.

Twenty sixth. The residue of the heavy stream, from which the burning oil distillate has been removed, is distilled to dryness, or to the desired extent short of dryness; and the so obtained distillate is utilized as pressure still stock.

Twenty seventh. The residue of the original oil operated upon which remains in the pressure still at the close of the high pressure run, and the residues of the high pressure distillate which remain as coke, or near coke, are disposed of as may be preferred.

Twenty eighth. The gases and incondensible vapors of distillation are disposed of as may be preferred.

Where parallel products are obtained it is well to mix them with each other, in order to simplify the procedure and plant. The mixture would then be operated upon as herein above described for the corresponding light stream product. Thus, for example, it is well to mix the heavy stream burning oil distillate with the light stream burning oil distillate and to operate upon the mixture as described for the latter. It is probably advantageous to distil the light stream naphtha bottoms separately; but if so desired, said bottoms could be mixed with the residual portion of the heavy stream (after removal of their motor spirit hydrocarbons) or with the heavy stream burning oil distillate; and the resulting mixture in either case could be operated upon as herein above described in respect to the light stream naphtha bottoms. Residues from different sources from which burning oil hydrocarbons have been removed can be mixed before distilling them to dryness, or to such lesser extent as may be preferred.

Where crude petroleum is distilled in the same establishment it may be expedient to mix some of the products of such distillation and some of the products of the high pressure distillation with each other, and thereafter to operate upon the respective mixtures as herein above described for the corresponding products of the high pressure distillation. Thus, for example, the light stream might well be mixed with crude naphtha obtained either in distilling the crude petroleum or in rerunning the mixed naphtha-burning-oil-gas-oil distillate of the crude oil run (or with crude naphtha obtained in both these modes); and the mixture could then be operated upon as described for said light stream. The burning oil distillate from either or both streams of high pressure distillate may well be mixed with (either or both) the water white burning oil distillate of the crude oil run and the burning oil distillate from rerunning the mixed naphtha-burning-oil-gas-oil distillate of the crude oil run; and the so obtained mixture could then be operated upon as described for the light stream burning oil distillate. Residues of distillates of the crude oil run and the high pressure run respectively which remain after removal of the burning oil hydrocarbons therefrom could be mixed and the mixture distilled for pressure still stock. Also, if it should be so desired, the heavy stream naphtha bottoms and the light stream naphtha bottoms (either or each of them) could be added to the mixed naphtha-burning-oil-gas-oil distillate of the crude oil run, or even to the water white burning oil distillate thereof.

It is considered best, in the high pressure distillation, to form the return condensate under the still pressure, and to condense the remaining vapors as distillate under atmospheric pressure; but the condensation of all or any part of the said distillate may be effected under the still pressure, if preferred; and the formation of return condensate under a reduced pressure is not necessarily excluded.

Additions can be made at will to the foregoing procedure within the scope of the invention; and parts of the said procedure can be used without employing other parts thereof.

Thus, according to one modification of said procedure, oil composed of gas oil or fuel oil hydrocarbons which have been obtained as residue in distilling burning oil distillate (either a water white distillate or the succeeding mixed naphtha-oil-gas-oil distillate or both) or as distillate in distilling a heavier distillate of the crude oil run (or which have been obtained in each of these ways) is operated upon as herein above set forth in respect to the heavier of the aforesaid distillates from rerunning burning oil distillate or the like; but there is a special advantage in using this heavier distillate rather than the material from which it would be derived. Furthermore, in accordance with this modification, any other suitable oil can be operated upon as herein above set forth, even crude petroleum or an undistilled residue thereof; but, in order to lessen the coating of the still bottom in the high pressure distillation, it is better to employ a distillate oil.

According to another modification, the vapors evolved in a high pressure distillation, wherein the conditions with respect to condensation within the still are other than those hereinabove set forth, are cooled outside the still in the form of an upwardly inclined stream of the character herein above set forth for formation of return condensate, the procedure otherwise being as herein above set forth.

According to a third modification, the vapors evolved in distilling a suitable oil under high pressure are not cooled outside the still in the form of an upwardly inclined stream of the character herein above set forth; but return condensate is formed in any other known or suitable mode, with such regulation, however, of the cooling therefor that the onward passing vapors, to be condensed as distillate, have the composition herein above set forth.

According to a fourth modification, the vapors which pass over to be condensed as distillate as herein above set forth and which have the composition herein above set forth, instead of being fractionated by contact with the walls of numerous parallel cooling pipes, are partially condensed in any other known or suitable mode, with such regulation of the cooling as is herein above set forth. There may, moreover, be a series of two or more partial condensations by contact with the walls of numerous parallel cooling pipes, or otherwise.

According to a fifth modification, the heavier of the distillates obtained as aforesaid in rerunning burning oil distillate or the like, instead of being subjected to distillation under superatmospheric pressure under the special condititons herein above set forth, is distilled in any other appropriate way at decomposing temperatures under superatmospheric pressure, as, for example, in any mode in which petroleum has heretofore been so distilled.

According to a sixth modification, high pressure distillate, obtained as herein above set forth, is disposed of otherwise, instead of being operated upon as herein above set forth.

According to a seventh modification, after obtaining a heavy stream and a light stream of distillate in a high pressure run and separatiing the light (naphtha or motor spirit) hydrocarbons from said light stream, the hydrocarbons of the then remaining residue (light stream naphtha bottoms) are subjected to further treatment with sulfuric acid as aforesaid, without the described intervening distillation. The acid treated oil (after separation of the acid sludge) is distilled to such extent as may be desired for light stream burning oil distillate.

Other modifications will suggest themselves, wherein enough of the procedure herein above set forth may be embodied to bring the modifications within the recitals of one or more of the claims at the close of this specification.

Figures 1 to 9 of the accompanying drawings illustrate, by way of example, one form of apparatus in accordance with the invention and Figs. 10 and 11 are diagrams of typical procedures.

Fig. 1 is a side view of the still end of the apparatus, the view being partly in section and partly in elevation.

Fig. 2 is a similar view of the condenser end of the apparatus, the views joining each other at the line A.

Fig. 3 is a partial view of the apparatus in plan, the line A being located as in Figs. 1 and 2.

Fig. 4 is a partial view in side elevation of the still and its setting which form part of said apparatus.

Fig. 5 is a vertical cross section of said still and its setting, the left half of the view on line $5^B$ of Fig. 4 and the right half on line $5^C$.

Fig. 6 is a central vertical section, broken away in the middle and on an enlarged scale, of a partial condenser, which forms part of the apparatus.

Fig. 7 is a view of said partial condenser with its cover removed, the upper half of the view in plan and the lower half in horizontal section on line $7^D$ of Fig. 2 partly broken away on line $7^E$.

Figs. 8 and 9 are detail views of a damper arrangement for certain air inlets, one of which appears at 3 in Fig 1.

Fig. 10 shows a mode of obtaining pressure still stock and other products from crude petroleum without the aid of pressure distillation.

Fig. 11 shows a procedure whereby motor spirit, burning oil (kerosene) and a heavier oil suitable for pressure still stock are obtained from the aforesaid or from other suitable stock, with the aid of pressure distillation.

In Figs. 10 and 11 the formation of gases and uncondensed vapors is noted only in the distillations to dryness and in the high pressure run, in order to avoid unnecessary crowding of the illustration.

The still $a$, say about ten feet in diameter by about forty feet in length and sufficiently strong to resist (with margin of safety) an internal pressure of about seventy five pounds per square inch above atmospheric pressure at decomposing temperatures is upheld by lugs $b$ secured thereto and resting upon the tops of columns $c$; whose bottoms rest upon the base $d$ of the still setting.

An open topped fire chamber $e$, with fire grate $f$ and ash pit $g$, is located in said base $d$ under one end of the still $a$ and is separated by the bridge wall $h$ from an open topped heating flue $i$ underlying the remainder of said still and leading to the down take $j$; which communicates with a chimney, not shown. The walls $k$ make contact with still $a$ at a considerable distance below said lugs. They protect the intermediate overlying portions of the still from the fire gases.

At $l$ $m$ are doors for fire chamber and ash pit, respectively. At $n$ is a peep hole. At $p$ are bolts passing through foot flanges of the columns $c$ for anchoring them to base $d$. At $r$ and $s$ are recesses in base $d$.

At the bottom of flue $i$ are gas burners $t$ in the form of pipes perforated on top at short intervals throughout the greater part of their length and supplied with gas from gas line $u$ through valved connecting pipes $v$ and with air from air line $w$ through valved connecting pipes $x$. They extend each of them through an open ended tube $y$. The underlying air flues $z$ have perforated roof plates 2 and open ended tubes 3 for admission of air. Dampers for regulating the air admission would be provided on tubes 3. In the arrangement of Figs. 8 and 9 the stationary cap $3^x$ on tube 3 is provided with air inlet openings and intermediate cut-off portions 3′, and carries the movable disk 3″, which is pivoted on the cap and is provided with corresponding air inlet openings and intermediate cut-off portions.

Two false bottoms 4 and 5 in still $a$, one a short distance above the other, are each of them constituted by plates hinged at 6 to the still wall and lapped (Fig. 1) one upon another at their adjacent margins. Said plates can thus be turned up for cleaning out the sediment (coke) which collects on the false bottoms and on the true bottom of the still.

At 7 are manholes. The charging line 8 has a valved branch pipe 9; which is turned (the fittings serving as hinges) in order to insert the outer end through the adjoining manhole when the still $a$ is to be supplied with oil.

The vapor pipe 10 connects with a safety valve 11. The escape pipe 12 (open at its outer end) extends therefrom through the overlying roof (not shown) or to whatever place may be desired. In order to protect the safety valve 11 from the heated vapors in normal operation, it is desirable to interpose a trap or U-bend 110 (Fig. 3) between the vapor pipe 10 and the safety valve 11 and to fill such trap with heavy oil, in order thus to form a liquid seal in said trap. The valved pipe 111 (Fig. 1) is provided for drawing off the oil from said trap when desired. The invention is not concerned with these arrangements.

The valved pipe 13 extends inside the still nearly to the bottom and is for removing the liquid which remains in the still at the close of each run.

A steam line 14 communicates with the vapor space of still $a$ through a valved branch 15 for letting steam into the still at the close of each run. Dry steam is insured by allowing the steam to escape temporarily through valved blow-off 16.

The still top is exposed to the atmosphere, say to the extent of about a third of the periphery of the still, in order to form, from a portion of the vapors, condensate which is returned to the oil in distillation by directly dripping into the same or by running down the still walls. The exposed area can be increased or diminished by varying the brickwork 17 or any non-conducting material. The ends of the still may well be provided with non-conducting jackets 18.

The vapor pipe 10 would best be of small diameter, say about four inches, more or less, and of considerable length, say about eighty feet, more or less. It is exposed to the atmosphere for cooling in order to form, from a portion of the vapors, condensate which is returned to the oil in distillation. The surface area of such a pipe would be about eighty four square feet and its cubic contents about seven cubic feet. The cooling area of a still having the dimensions given above would be about four hundred and twenty square feet, if one-third of its periphery (excluding the ends) should be exposed to the atmosphere. The cubic contents of the still itself would be over three thousand cubic feet. Said pipe 10 is inclined upward from the still; so that condensate formed in said pipe will, on its way to the still, flow under and in contact with the outwardly flowing vapors. Extended opportunity is thus afforded for an interchange of hydrocarbons between condensate and vapors; and a better separation of hydrocarbons of different boiling points from each other is in consequence effected.

At its outer end the vapor pipe 10 is connected by the cross pipe 19 and branch pipes 20 with the tower 21 for partially condensing the vapors supplied thereto. In each pipe 20 there is a vapor throttling device 22, in the form as shown of a hand operated valve, best of needle type. Automatically operated valves are not necessarily excluded, but are not desirable.

Piping of three-quarters of an inch in diameter suffices for pipes 20, and is advantageous in view of the small size of valve 22 which it is desirable to employ.

The vapor condensing tower 21 consists (Fig. 6) of an upright cylinder (say six feet in diameter by thirteen feet in length) with tube sheets 222 near its top and bottom respectively, and also with numerous pipes 23 open at both ends and secured at the ends in said tube sheets, say 84 pipes of four inches diameter and eleven feet long. The pipes 20 open into the lower part of the space around pipes 23, and the vapor outlet pipe 24 leads from the upper part of the same space.

From the bottom of the same space leads a distillate draw-off pipe 25; which includes a trap 26 and which is immersed for most of its length in the cooling water of tank 27.

At the top of vapor condensing tower 21 there is an adjustable valve, composed of a stationary plate 28 and a movable plate 29, each of them provided with air exit ports in the form of slots that register more or less with one another when the valve is more or less open and are out of registry when the valve is closed. At 30 is a stationary spacing ring surrounding the movable plate 29, and at 31 a stationary top ring which overlaps the margin of said movable plate 29. A bolt 32 passing through holes in plates 29 and 28 is tapped into disk 33; which rests upon the top of post 34, fastened by its flanged base to the upper flue sheet 222. At 35 are washers and at 36 a nut for the bolt 32.

The lever 37 fulcrumed on bracket 38, which is fast on the tower 21, has a slot and pin connection with an arm 39, which is fastened to the movable valve plate 29. At 40 are stops for restricting the movement.

Near the bottom the tower has air inlet ports 41 (say three sets of four holes two inches in diameter) and slides 42, movable in ways 43, for regulating the amount of air admitted.

The roof 44 is supported above the valve plates 28 and 29 at such height that air, escaping from the tower cylinder 21, can pass out into the surrounding atmosphere.

The vapor pipe 24 is connected with a condenser pipe 45 immersed for most of its length in the cooling water of tank 27 and terminating in a distillate draw-off 450 distinct from the draw-off 25. Each of these draw-offs is provided with a valve. Water is supplied to tank 27 by valved pipe 46; which discharges into the wide splash pipe 47 opening into the tank 27 near the bottom. The water escapes by the valved overflow pipe 48. For each of the pipes 25 and 45 there is a box or tee 49 provided with a valved pipe 50 for conducting gas or uncondensed vapors away.

From the cross pipe 19 a valved pipe 51 leads to a discharge line 52; which is connected by valved pipe 53 and a lower level discharge line 54, with a coil 55 in the cooling tank 56 that has a valved water supply pipe 57 and a valved water outlet pipe 58. The pipe 13 connects with the same coil 55 through the line 54.

From a point on the vapor pipe 10 intermediate the still $a$ and vapor condensing tower 21 a valved by-pass 59 leads around the tower 21 to the water cooled condenser pipe 45.

The valves of various pipes are marked 60. Supports for the various parts are provided as may be necessary or expedient. At 61 is a platform for supporting the tank 27. At 62 a bracket is shown for upholding the upper level discharge line 52 and the therewith connected pipes. At 63 and 64 are beams for upholding the tower 21. At 65 are blocks under the ends of beam 64. At 650 is a pressure gage.

Charging line 8, discharge line 54 and other lines transverse to the length of still $a$ are employed, in order that they may serve a number of stills placed side by side. The column at the right of Fig. 5 is shown with a bracket on each side at the top in order that it may receive lugs $b$ of adjoining stills.

The still $a$ may be supplied with about 15,750 gallons of oil through the charging line 8 and its branch 9, the cover of the adjacent manhole 7 being temporarily removed. The said cover is replaced; and the still being now entirely tight the valve in by-pass 59 is opened and the valve in vapor pipe 10 beyond its junction with said by-pass 59 is closed. The valves in the gas and liquid outlets of cooling pipe 25 and condenser pipe 45 are open. The valves belonging to the steam branch 15 are closed, as is also the valve in pipe 13.

The temperature of the still $a$ and its contents is then raised gradually by fires in fire chamber $e$ and at gas burners $t$ until oil without water appears at the liquid outlet from condenser 45. The vapor throttling valves 22 (one or both of them) are now opened, and also the valve in vapor pipe 10; the valve in by-pass 59 is closed; and the heating is continued until oil appears at the liquid outlet from cooling pipe 25.

The vapor throttling valves 22 are then both of them closed; and the pressure in the still $a$ is allowed to accumulate until the pressure gage 650 indicates approximately 75 pounds per square inch above atmospheric pressure.

The vapor throttling valves 22 are then both of them opened gradually and to an at least approximately equal extent. They may well be opened to such an extent that with said pressure of 75 pounds the vapors passing said valves will form distillate at a rate somewhat under one and seven-tenths per cent per hour of the original still charge (say an average of about four and four-tenths gallons in all of distillate per minute from both pipes 25 and 45 for a still charge of 15,750 gallons).

Distillation is then carried on with such regulation of the still fires as to maintain the still pressure as nearly as possible at 75 pounds gage pressure.

The evolved vapors are partially condensed in the vapor space above the oil in distillation; and the uncondensed vapors are further partially condensed in the vapor pipe 10. The condensate from both of these partial condensations is returned to the oil in distillation; and an extended interchange of hydrocarbons takes place between the onward flowing vapors and the returning condensate in the vapor pipe 10, the more volatile constituents of the condensate being vaporized and carried onward, and the less volatile constituents of the vapors being condensed and returned to the still. By effecting a partial condensation in the vapor space of the still the heat of the oil in distillation, and of the still and its setting as well, tends to prevent excessive variations in the volume of condensate formed, in consequence of variations in the currents of air coming into contact with the exposed top of the still, notwithstanding the fact that a large and compact body of vapors exists in said space. On the other hand, by the additional partial condensation of vapors between the more closely approached heat conducting walls of vapor pipe 10 and by the extended opportunity for interchange of hydrocarbons between condensate and the vapors as explained, a more efficient separation of hydrocarbons is obtained than by a partial condensation in the vapor space alone. This separation in vapor pipe 10 is proportionately more efficient, in consequence of the delivery thereto of vapors which have been previously cooled in the vapor space of still $a$.

It is advantageous to lessen the cooling in the vapor pipe 10 so far as consistent with efficiency, for one reason because the fluids (vapors or condensate, or both) exert a corroding action on the walls of said pipe. So great is this corrosion that all parts of the vapor pipe 10 should be examined periodically and renewals made as may be required.

Another reason, which applies when, as is most convenient, the cooling is effected by exposure to the atmosphere, is that with such cooling the formation of condensate in vapor pipe 10 is apt to vary more than in the vapor space of the still. By having a relatively small volume of vapors in said pipe 10 the influence of such variation is made small.

For both of these reasons it is advantageous to employ a vapor pipe 10 of small diameter, the smaller in general the better, consistently with a free passage therein of the vapors and condensate in opposite directions.

It may be observed in passing that (as shown) there is an absorption of heat by the expanding vapors in the pipes 20 near the upper end of pipe 10 and that this would tend to lower the temperature in the upper end of the pipe 10, in so far at least as it may by conduction abstract heat from the wall of said pipe 10.

After passing the throttling valves 22, the vapors enter the lower part of the tower 21, in the space (Fig. 6) between the tube sheets 222 outside of the cooling pipes 23. On opening the air inlet and air exit ports, by suitably adjusting slides 43 and plate 29, the heat in pipes 23 induces upward currents of air. The vapors are cooled by flowing in contact with the walls of these numerous parallel pipes 23; which walls are interposed between the currents of said vapors and of the aeriform cooling agent respectively. As shown, said vapors are outside and the cooling agent inside of said pipes; but similar cooling could be obtained by a reversed arrangement in which the cooling air should flow over the outside of numerous parallel pipes and the vapors inside the same.

The condensate which forms in tower 21 escapes by the distillate draw-off pipe 25 and is cooled by the water in tank 27.

The uncondensed vapors from tower 21 pass by vapor pipe 24 to the water cooled condenser pipe 45. Vapors remaining uncondensed and uncondensible gas escape by the pipes 50 and are delivered to be burned as fuel in burners $t$ or are otherwise disposed of, as may be preferred.

Distillation under high pressure should not be carried so far as to become dangerous; and it can be arrested whenever desired. Firing is then discontinued; and the pressure in the still $a$ is allowed to fall, the evolved vapors continuing to pass over to the tower 21.

When this pressure has fallen as low as desired (say to about fifty pounds, more or less, per square inch above atmospheric pressure) the valves in pipe 13 are opened; and the throttle valve 22 are closed. The pressure in the still then forces the fluid (liquid and aeriform) contents of the still through pipe 13, line 54 and coil 55 to any appropriate receiver (the aeriform contents being condensed in large part at least in said coil 55). When the still pressure has thus been sufficiently reduced (say to about ten pounds, more or less) steam is introduced through branch 15 into the still $a$ (pipe 13 remaining open) until practically all of the hydrocarbon vapors have been expelled.

The steam is then shut off; the valves in pipe 13 are closed; and when the still has cooled off, it is thoroughly cleaned, inspected and (if necessary) repaired preparatory to a new run.

The valves in pipes 51, 52 and 53 leading by way of line 54 to coil 55 are not normally opened. Said pipes are provided as a relief line, should it be necessary at any time to reduce the pressure in the still $a$ quickly.

During a run, if any defect at all serious should appear either in the still or vapor pipe, the fires should be drawn, the still emptied, and proper repairs made before again charging the still with oil for a new run.

In a run performed with the apparatus described on gas oil or fuel oil of specific gravity 0.8483 under a superatmospheric pressure in the still $a$ of about seventy five pounds per square inch with such throttling of the vapors at the valves 22 that distillate from both pipes 25 and 45 equal to about sixty and seven-tenths per cent. of the original still charge was collected in thirty six hours, the observed temperatures of the oil in distillation ranged from 696° F. to 736° F., rising gradually and steadily, average 713° F.; those of the vapors leaving still $a$ at thermometer 66 ranged from 528° F. to 578° F., average 556° F. while at thermometer 67 (Fig. 3) just beyond the divide which separates distillate hydrocarbons from those returned to the still $a$ the temperatures ranged from 432° F. to 498° F., varying irregularly, average 465° F. The temperatures were observed at the close of every hour.

The temperatures at the top of pipe 24 (thermometer 68) ranged from 267° F. to 390° F., average 341° F.

The residual material in the still at the close of the run amounted to about thirty six and three-tenths per cent. of the original charge, loss about three per cent.

A sample of this total distillate (obtained by mixing fairly representative samples of the total distillate from each of the pipes 25 and 45 in proportion to the total volumes of the two streams and having a specific gravity of about 0.7857) was subjected to a distillation assay and showed:

| | |
|---|---|
| Distillate up to 302° F., about | 23.0% |
| Distillate 302° to 410° F., about | 29.5% |
| Distillate 410° F. to 518°, about | 35.5% |
| Oil in assay flask at 518° F., about | 10.0% |
| Loss (by difference), about | 2.0% |
| Total | 100.0% |

The vapors leaving vapor pipe 10 in this run thus had a content of about ten per cent. (measured in liquid state) of hydrocarbons with boiling points above 518° F.

The distillate (heavy stream) from partially condensing these vapors, drawn off from tower 21 through pipe 25, amounted to about twenty four and five-tenths per cent. of the original charge of still $a$. It had a specific gravity of about 0.8156. A fairly representative sample of it was subjected to a distillation assay and showed:

| | |
|---|---|
| Distillate up to 302° F., about | 4.5% |
| Distillate 302° F. to 410° F., about | 14.0% |
| Distillate 410° F. to 518° F., about | 56.5% |
| Oil in assay flask at 518° F., about | 23.5% |
| Loss (by difference), about | 1.5% |
| Total | 100.0% |

The distillate (light stream) from the draw-off of water cooled condenser 45 amounted to about thirty six and two-tenths per cent. of the original charge of still $a$. It had a specific gravity of about 0.7641. A fairly representative sample of it was subjected to a distillation assay and showed:

| | |
|---|---|
| Distillate up to 302° F., about | 37.0% |
| Distillate 302° F. to 410° F., about | 35.0% |
| Distillate 410° F. to 518° F., about | 23.5% |
| Oil in assay flask at 518° F., about | 1.5% |
| Loss (by difference), about | 3.0% |
| Total | 100.0% |

While the two streams of high pressure distillate, the light stream from condenser 45 and the heavy stream from tower 21 can be operated upon, or disposed of, as may be preferred, the invention includes the subjection of them to the operations, or an appropriate part at the least of the operations, set forth in the earlier part of the present specification for obtaining (1) a light product (such as motor spirit), (2) burning oil (kerosene), (3) pressure still stock, and (4) residual materials which may be (in whole or in part) in the form of coke, from two streams of high pressure distillate.

For the performance of these operations ordinary agitators and stills will suffice; and the foregoing description will enable those skilled in the art to perform the same. It may be added, however, in respect to the high pressure distillate from the aforesaid gas oil or fuel oil of specific gravity 0.8483 that about five pounds of ordinary concentrated sulfuric acid containing 92.5% to 93% by weight of sulfuric monohydrate ($H_2SO_4$) to each forty two gallons of oil would be suitable for giving the mild treatment mention to the light stream high pressure distillate (including the light end of the heavy stream) and about seven pounds of the same description of acid for the treatment of the mixed burning oil distillates from the light stream naphtha bottoms and the heavy stream naphtha bottoms respectively.

The approximate yields from such gas oil or fuel oil would be as follows in percentages of the oil charged into still $a$ at the beginning of the high pressure run.

| | |
|---|---|
| Motor spirit, specific gravity say 0.7389, about | 24.9% |
| Burning oil (kerosene), specific gravity say 0.8109, about | 21.9% |
| Pressure still stock, specific gravity say 0.8762, about | 12.4% |
| Coke and loss in working up high pressure distillate (by difference), about | 1.5% |
| Total high pressure distillate, about | 60.7% |
| Residue of original oil, withdrawn from still $a$ at close of high pressure run, about | 36.3% |
| Loss in high pressure run (by difference), about | 3.0% |
| Total charge of still $a$ | 100.0% |

In a distillation assay about eighty per cent. of said motor spirit would distil over below 302° F. and about seventeen and five-tenths per cent. thereof between 302° F. and 395° F. (flask dry at last mentioned temperature); loss in assay about two and five-tenths per cent.

The said burning oil (kerosene) would be water white; with a flash test of about 110° F.; and in distillation assay about ninety five and five-tenths per cent. of it would distil over below 518° F. (oil in assay flask about three and five-tenths per cent. at last mentioned temperature); loss in assay about one per cent.

In a concurrent application, No. 796,310, filed October 20, 1913, on which Patent 1,221,790 was granted Apr. 3, 1917, I have described and claimed some of the matter exhibited herein. The application for the present patent is to be regarded as a continuation of said concurrent application in so far as it properly may be so regarded.

I claim herein as my invention or discovery:

1. In the art of obtaining products from petroleum, wherein hydrocarbons boiling above 518° F. are collected in admixture with those boiling below 518° F., in the form of burning oil (kerosene) distillate from distilling crude petroleum under relatively low pressure (as atmospheric pressure, for example), and are afterward separated from lighter components of said burning oil (kerosene) distillate, by partial distillation of this latter under relatively low pressure, and are yet later distilled at decomposing temperatures under superatmospheric pressure of more than thirty pounds per square inch, the improvement which consists in subjecting the residual oil from partially distilling said burning oil (kerosene) distillate to distillation under relatively low pressure, with collection of distillate that boils above 518° F., and in distilling this last mentioned distillate at decomposing temperatures under superatmospheric pressure of more than thirty pounds per square inch, substantially as described.

2. In the art of obtaining products from petroleum, wherein hydrocarbons boiling above 518° F. are collected in admixture with those boiling below 518° F., in the form of burning oil (kerosene) distillate from distilling crude petroleum under relatively low pressure (as atmospheric pressure, for example), and are afterward separated from lighter components of said burning oil (kerosene) distillate, by partial distillation of this latter under relatively low pressure, and are yet later distilled at decomposing temperatures under superatmospheric pressure of more than thirty pounds per square inch, the improvement which comprises (1) treating said burning oil (kerosene) distillate with sulfuric acid, (2) separating reaction products, (3) partially distilling the acid treated oil, (4) subjecting residual oil from which lighter components have thus been separated to distillation under relatively low pressure, with collection of distillate that boils above 518° F., and (5) distilling this last mentioned distillate at decomposing temperatures under superatmospheric pressure of more than thirty pounds per square inch, substantially as described.

3. In the art of obtaining products from petroleum, wherein hydrocarbons boiling above 518° F. are subjected, in the form of a compact body of petroleum with an original volume of not less than five thousand gallons, to distillation at decomposing temperatures under superatmospheric pressure of more than thirty pounds per square inch, accompanied by a cooling of so evolved vapors for formation of condensate which is returned to the oil in distillation and by a further cooling of the then remaining vapors for formation of condensate which is collected as distillate, the improvement which consists in reducing the average temperature of so evolved vapors in their compressed state at least as low as 518° F. and not below 410° F. for formation of so returned condensate, by cooling said vapors first in the vapor space overlying said body of petroleum through contact of the same with the exposed top of the sill and afterward in an outside space, whose cubic content is less than one and a half per cent. of the original volume of the said body of petroleum, by means of a relatively long travel of the vapors between air cooled walls that are relatively close together as compared with like conditions in the still, in such manner that the vapors at their exit from the still are between one hundred degrees F. and two hundred degrees F. below the contemporaneous temperatures of the oil in distillation, and are between forty degrees F. and one hundred and forty degrees F. cooler at the place where said formation of return condensate ceases than they are at their said exit from the still, the vapors which pass onward from the place just mentioned being further cooled for formation of condensate which is collected as distillate, substantially as described.

4. In the art of obtaining products from petroleum, wherein hydrocarbons boiling above 518° F. are subjected, in the form of a compact body of petroleum with an original volume of not less than five thousand gallons, to distillation in a still of elongated cylindrical form at decomposing temperature under superatmospheric pressure of more than thirty pounds per square inch, accompanied by a cooling of so evolved vapors for formation of condensate which is returned to the oil in distillation and by a further cooling of the then remaining vapors for formation of condensate which is collected as distillate, the improvement which consists in reducing the average temperature of so evolved vapors in their compressed state at least as low as 518° F. and not below 410° F. for formation of so returned condensate, by cooling said vapors first in the vapor space overlying said body of petroleum through contact of the same with an area of exposed still top equal to about one-third the periphery of said still and afterward in an outside space, whose cubic content is less than one and a half per cent. of the original volume of the said body of petroleum, by means of a relatively long travel of the vapors between air cooled walls that are relatively close together as compared with like conditions in the still and that have an area of exposed surface equal to between ten per cent. and thirty per cent. of the exposed area of said still top, the vapors which pass onward from the place where said formation of return condensate ceases being further cooled for formation of condensate which is collected as distillate, substantially as described.

5. In apparatus for obtaining products from petroleum, which apparatus comprises (first) a still in the form of an elongated cylinder with a capacity of not less than one thousand cubic feet and with walls sufficiently strong to withstand a superatmospheric pressure of more than thirty pounds per square inch at oil decomposing temperatures, (second) means for heating said still and its liquid contents to oil decomposing temperatures, (third) an outside partial condenser which receives vapors from said still and returns condensate thereto and in which the vapors are cooled by a relatively long travel between air cooled walls that are relatively close together as compared with like conditions in the still, (fourth) means whereby the contents of said still and said outside partial condenser can be held under a superatmospheric pressure of more than thirty pounds per square inch, and (fifth) condensing means which receive vapors from said outside partial condenser and which discharge the therein formed condensate as distillate, the improvement which not only includes all of the foregoing parts, but which comprises the three following features in addition thereto, namely: (1) the exposure of the top of said elongated cylindrical still to the atmosphere over an area equal to about one-third of its periphery, (2) an interior construction of said still which allows the return to the oil in distillation of condensate formed in the vapor space of the said still, and (3) a construction of said outside partial condenser wherein the compressed vapors are cooled to form return condensate as aforesaid in such manner that the cubic content thereof is less than one per cent. of the still capacity and that its air cooled walls have an exposed surface equal to between ten per cent. and thirty per cent. of said exposed area of the still top, substantially as described.

6. In the art of obtaining products from petroleum, wherein hydrocarbons boiling above 518° F. are subjected, in the form of a compact body of petroleum with an original volume of not less than five thousand gallons, to distillation at decomposing temperatures under superatmospheric pressure of more than thirty pounds per square inch, accompanied by a cooling of so evolved vapors for formation of condensate which is returned to the oil in distillation and by a further cooling of the then remaining vapors for formation of condensate which is collected as distillate, the improvement which consists in forming part at least of the so returned condensate by passing the compressed vapors over air cooled walls outside of the still in such manner that from the commencement of the outside cooling said vapors have the form of a single elongated stream, inclined upwardly at an oblique angle and restricted in diameter about as far as may be consistent with the free passage of the compressed vapors and the condensate in opposite directions, said stream being less than six inches in diameter in any case and upward of one hundred diameters in length in any case, and being exemplified by a four-inch stream eighty feet long in distilling a body of petroleum with an original volume of about fifteen thousand gallons at decomposing temperatures under a superatmospheric pressure of about seventy five pounds per square inch, and the vapors that pass onward from the place where the formation of return condensate ceases being further cooled for formation of condensate which is collected as distillate, substantially as described.

7. In apparatus for obtaining products from petroleum, which apparatus comprises (first) a still with a capacity of not less than one thousand cubic feet and with walls sufficiently strong to withstand a superatmospheric pressure of more than thirty pounds per square inch at oil decomposing temperatures, (second) means for heating said still and its liquid contents to oil decomposing temperatures, (third) an outside partial condenser which receives vapors from said still and returns condensate thereto and in which the vapors are cooled by a relatively long travel between air cooled walls that are relatively close together as compared with like conditions in the still, (fourth) means whereby the contents of said still and said outside partial condenser can be held under a superatmospheric pressure of more than thirty pounds per square inch, and (fifth) condensing means which receive vapors from said outside partial condenser and which discharge the therein formed condensate as distillate, the improvement which not only includes all the foregoing parts, but which comprises the two following features in addition thereto, namely: (1) the construction of said outside partial condenser, wherein the compressed vapors are cooled to form return condensate as aforesaid, in the form of a single elongated pipe, inclined upwardly at an oblique angle and restricted in diameter about as far as may be consistent with the free passage of the compressed vapors and the condensate in opposite directions, said pipe being less than six inches in diameter in any case and upward of one hunderd diameters in length in any case, and being exemplified by a four-inch pipe eighty feet long for a still with a capacity of about three thousand cubic feet, and (2) a connection of said pipe with the vapor space of the still which allows the vapors to enter said pipe at the temperature which they have on leaving the still, substantially as described.

8. In the art of obtaining products from petroleum, wherein hydrocarbons boiling above 518° F. are subjected, in the form of a compact body of petroleum with an original volume of not less than five thousand gallons, to distillation at decomposing temperatures under superatmospheric pressure of more than thirty pounds per square inch, accompanied by a cooling of so evolved vapors for formation of condensate which is returned to the oil in distillation and by a further cooling of the then remaining vapors for formation of condensate which is collected as distillate, the improvement which consists in reducing the average temperatures of so evolved vapors in their compressed state at least as low as 518°F. and not below 410° F. for formation of so returned condensate, by cooling said vapors first in the vapor space overlying said body of petroleum to between one hundred degrees F. and two hundred degrees F. below the contemporaneous temperatures of the oil in distillation, through contact of the vapors with the exposed top of the still, and afterward in an outside space, whose cubic content is less than one and a half per cent of the original volume of said body of petroleum through a further temperature interval of between forty degrees F. and one hundred and forty degrees F. by travel of the compressed vapors over air cooled walls in such manner that from the commencement of the outside cooling the vapors have the form of a single elongated stream, inclined upwardly at an oblique angle and restricted in diameter about as far as may be consistent with the free passage of the compressed vapors and the condensate in opposite directions, the said stream being less than six inches in diameter in any case and upward of one hundred diameters in length in any case, and being exemplified by a four-inch stream eighty feet long in distilling a body of petroleum with an original volume of about fifteen thousand gallons at decomposing temperatures under a superatmospheric pressure of about seventy-five pounds per square inch, and the vapors that pass onward from the place where the formation of return condensate ceases being further cooled for formation of condensate which is collected as distillate, substantially as described.

9. In the art of obtaining products from petroleum, wherein hydrocarbons boiling above 518° F. are subjected, in the form of a compact body of petroleum with an original volume of not less than five thousand gallons, to distillation in a still of elongated cylindrical form at decomposing temperatures under superatmospheric pressure of more than thirty pounds per square inch, accompanied by a cooling of so evolved vapors for formation of condensate which is returned to the oil in distillation and by a further cooling of the then remaining vapors for formation of condensate which is collected as distillate, the improvement which consists in reducing the average temperature of so evolved vapors in their compressed state at least as low as 518° F. and not below 410° F. for formation of so returned condensate, by cooling said vapors first in the vapor space overlying said body of petroleum through contact of the same with an area of exposed still top equal to about one-third the periphery of said still, and afterward in an outside space, whose cubic content is less than one and a half per cent. of the original volume of said body of petroleum, by means of a relatively long travel of the vapors between air cooled walls that are relatively close together as compared with like conditions in the still and that have an area of exposed surface equal to between ten per cent. and thirty per cent. of the exposed area of said still top in such manner that from the commencement of the outside cooling the vapors have the form of a single elongated stream, inclined upwardly at an oblique angle and restricted in diameter about as far as may be consistent with the free passage of the compressed vapors and the condensate in opposite directions, the said stream being less than six inches in diameter in any case and upward of one hundred diameters in length in any case, and being exemplified by a four-inch stream eighty feet long in distilling a body of petroleum with an original volume of about fifteen thousand gallons at decomposing temperatures under a superatmospheric pressure of about seventy five pounds per square inch, and the vapors that pass onward from the place where the formation of return condensate ceases being further cooled for formation of condensate which is collected as distillate, substantially as described.

10. In apparatus for obtaining products from petroleum, which apparatus comprises (first) a still in the form of an elongated cylinder with a capacity of not less than one thousand cubic feet and with walls sufficiently strong to withstand a superatmospheric pressure of more than thirty pounds per square inch at oil decomposing temperatures, (second) means for heating said still and its liquid contents to oil decomposing temperatures, (third) an outside partial condenser which receives vapors from said still and returns condensate thereto and in which the vapors are cooled by a relatively long travel between air cooled walls that are relatively close together as compared with like conditions in the still, (fourth) means whereby the contents of said still and said outside partial condenser can be held under a superatmospheric pressure of more than thirty pounds per square inch, and (fifth) condensing means which receive vapors from said outside partial condenser and which discharge the therein formed condensate as distillate, the improvement which not only includes all the foregoing parts, but which comprises the four following features in addition thereto, namely: (1) the exposure of the top of said elongated cylindrical still to the atmosphere over an area equal to about one-third of its periphery, (2) an interior construction of said still which allows the return to the oil in distillation of condensate formed in the vapor space of the said still, (3) a construction of said outside partial condenser wherein the compressed vapors are cooled to form return condensate as aforesaid in the form of a single elongated pipe, inclined upwardly at an oblique angle and restricted in diameter about as far as may be consistent with the free passage of the compressed vapors and the condensate in opposite directions, said pipe being less than six inches in diameter in any case and upward of one hundred diameters in length in any case, and having a cubic content of less than one per cent. of the still capacity and an area of exposed wall surface equal to between ten per cent. and thirty per cent. of said exposed area of the still top, and being exemplified by a four-inch pipe eighty feet long for a still with a capacity of about three thousand cubic feet, and (4) a connection of said pipe with the vapor space of the still which allows the vapors to enter said pipe at the temperature which they have on leaving the still, substantially as described.

11. In the art of obtaining products from petroleum, wherein hydrocarbons boiling above 518° F. are subjected to distillation at decomposing temperatures under superatmospheric pressure, accompanied by a cooling of so evolved vapors for formation of condensate which is returned to the oil in distillation and by a further cooling of the then remaining vapors for formation of condensate which is collected as distillate, the improvement which consists in performing said cooling for formation of return condensate in such manner that the then remaining vapors contain a relatively large proportion of hydrocarbons boiling above 410° F. (as compared with customary crude motor spirit of the pressure distillation type) and at least an appreciable amount of hydrocarbons boiling above 518° F. but a proportion nevertheless of the latter which is smaller than customary in burning oil (kerosene) distillate, that is to say, not less than thirty five per cent. (measured in liquid state) of hydrocarbons boiling above 410° F. and not more than twenty five per cent. of those boiling above 518° F., a typical composition for said vapors (subsequently condensed as distillate as aforesaid) comprising about forty five per cent. of hydrocarbons boiling above 410° F. and about ten per cent. above 518° F., substantially as described.

12. In the art of obtaining products from petroleum, wherein hydrocarbons boiling above 518° F. are subjected to distillation at decomposing temperatures under super-atmospheric pressure, accompanied by a cooling of so evolved vapors for formation of condensate which is returned to the oil in distillation and by a further cooling of the then remaining vapors for formation of condensate which is collected as distillate, the improvement which consists (first) in performing said cooling for formation of return condensate in such manner that the then remaining vapors contain a relatively large proportion of hydrocarbons boiling above 410° F. (as compared with customary crude motor spirit of the pressure distillation type) and at least an appreciable amount of hydrocarbons boiling above 518° F. but a proportion nevertheless of the latter which is smaller than customary in burning oil (kerosene) distillate, that is to say, not less than thirty five per cent. (measured in liquid state) of hydrocarbons boiling above 410° F. and not more than twenty five per cent. of those boiling above 518° F., a typical composition for said vapors (subsequently condensed as distillate as aforesaid) comprising about forty five per cent. of hydrocarbons boiling above 410° F. and about ten per cent. above 518° F., and (second) in separating said hydrocarbons (whose vapors are thus condensed as distillate) into oils of different gravities in such manner that one at least of said oils boils in part below and in part above 302° F. and practically all of it below 410° F., substantially as described.

13. In the art of obtaining products from petroleum, wherein hydrocarbons boiling above 518° F. are subjected to distillation at decomposing temperatures under super-atmospheric pressure, accompanied by a cooling of so eveloved vapors for formation of condensate which is returned to the oil in distillation and by a further cooling of the then remaining vapors for formation of condensate which is collected as distillate, the improvement which consists (first) in performing said cooling for formation of return condensate in such manner that the then remaining vapors contain a relatively large proportion of hydrocarbons boiling above 410° F. (as compared with customary crude motor spirit of the pressure distillation type) and at least an appreciable amount of hydrocarbons boiling above 518° F. but a proportion nevertheless of the latter which is smaller than customary in burning oil (kerosene) distillate, that is to say, not less than thirty five per cent. (measured in liquid state) of hydrocarbons boiling above 410° F. and not more than twenty five per cent. of those boiling above 518° F., a typical composition for said vapors (subsequently condensed as distillate as aforesaid) comprising about forty five per cent. of hydrocarbons boiling above 410° F. and about ten per cent. above 518° F., and (second) in separating said hydrocarbons (whose vapors are thus condensed as distillate) into oils of different gravities in two stages, in the first of which an oil that boils in part above 410° F. but is practically free from hydrocarbons boiling above 518° F. is obtained as one of the products, and in the second of which this oil is partially distilled with collection of distillate that boils practically all of it below 410° F., substantially as described.

14. In the art of obtaining products from petroleum, wherein hydrocarbons boiling above 518° F. are subjected to distillation at decomposing temperatures under superatmospheric pressure, accompanied by a cooling of so evolved vapors for formation of condensate which is returned to the oil in distillation and by a further cooling of the then remaining vapors for formation of condensate which is collected as distillate, the improvement which consists (first) in performing said cooling for formation of return condensate in such manner that the then remaining vapors contain a relatively large proportion of hydrocarbons boiling above 410° F. (as compared with customary crude motor spirit of the pressure distillation type) and at least an appreciable amount of hydrocarbons boiling above 518° F. but a proportion nevertheless of the latter which is smaller than customary in burning oil (kerosene) distillate, that is to say, not less than thirty five per cent. (measured in liquid state) of hydrocarbons boiling above 410° F. and not more than twenty five per cent. of those boiling above 518° F., a typical composition for said vapors (subsequently condensed as distillate as aforesaid) comprising about forty five per cent. of hydrocarbons boiling above 410° F. and about ten per cent. above 518° F., (second) in separating said hydrocarbons (whose vapors are thus condensed as distillate) into oils of different gravities in such manner that one at least of said oils boils in part above 410° F. but is practically free from hydrocarbons boiling above 518° F., (third) in subjecting this oil to treatment with sulfuric acid, (fourth) in separating reaction products, (fifth) in distilling the acid treated oil in such manner that oils of different gravities are obtained, the lighter at least of them as distillate, (sixth) in subjecting a so obtained heavier oil to treatment with sulfuric acid, and (seventh) in separating reaction products, the hydrocarbons composing this heavier oil being thus subjected to sulfuric acid in admixture with lighter hydrocarbons and again after separation of the latter therefrom, substantially as described.

15. In the art of obtaining products from petroleum, wherein hydrocarbons boiling above 518° F. are subjected to distillation at decomposing temperatures under superatmospheric pressure, accompanied by a cooling of so evolved vapors for formation of condensate which is returned to the oil in distillation and by a further cooling of the then remaining vapors for formation of condensate which is collected as distillate, the improvement which consists (first) in performing said cooling for formation of return condensate in such manner that the then remaining vapors contain a relatively large proportion of hydrocarbons boiling above 410° F. (as compared with customary crude motor spirit of the pressure distillation type) and at least an appreciable amount of hydrocarbons boiling above 518° F. but a proportion nevertheless of the latter which is smaller than customary in burning oil (kerosene) distillate, that is to say, not less than thirty five per cent. (measured in liquid state) of hydrocarbons boiling above 410° F. and not more than twenty five per cent. of those boiling above 518° F., a typical composition for said vapors (subsequently condensed as distillate as aforesaid) comprising about forty five per cent. of hydrocarbons boiling above 410° F. and about ten per cent. above 518° F., and (second) in fractionally condensing said vapors in such manner that a light stream distillate, which boils in part above 410° F. but is practically free from hydrocarbons boiling above 518° F., is obtained along with a stream of heavier distillate, substantially as described.

16. In the art of obtaining products from petroleum, wherein hydrocarbons boiling above 518° F. are subjected to distillation at decomposing temperatures under superatmospheric pressure, accompanied by a cooling of so evolved vapors for formation of condensate which is returned to the oil in distillation and by a further cooling of the then remaining vapors for formation of condensate which is collected as distillate, the improvement which consists (first) in performing said cooling for formation of return condensate in such manner that the then remaining vapors contain a relatively large proportion of hydrocarbons boiling above 410° F. (as compared with customary crude motor spirit of the pressure distillation type) and at least an appreciable amount of hydrocarbons boiling above 518° F. but a proportion nevertheless of the latter which is smaller than customary in burning oil (kerosene) distillate, that is to say, not less than thirty five per cent. (measured in liquid state) of hydrocarbons boiling above 410° F. and not more than twenty five per cent. of those boiling above 518° F., a typical composition for said vapors (subsequently condensed as distillate as aforesaid) comprising about forty five per cent. of hydrocarbons boiling above 410° F. and about ten per cent. above 518° F., (second) in fractionally condensing said vapors in such manner that a light stream distillate, which boils in part above 410° F. but is practically free from hydrocarbons boiling above 518° F. is obtained along with a stream of heavier distillate, (third) in subjecting this light stream distillate to treatment with sulfuric acid, (fourth) in separating reaction products, (fifth) in distilling the acid treated oil in such manner that oils of different gravities are obtained, the lighter at least of them as distillate, (sixth) in subjecting a so obtained heavier oil to treatment with sulfuric acid, and (seventh) in separating reaction products, the hydrocarbons composing this heavier oil being thus subjected to sulfuric acid in admixture with lighter hydrocarbons and again after separation of the latter therefrom, substantially as described.

17. In the art of obtaining products from petroleum, wherein hydrocarbons boiling above 518° F. are collected in admixture with those boiling below 518° F., in the form of high pressure distillate from subjecting hydrocarbons that boil above 518° F. to distillation at decomposing temperatures under superatmospheric pressure in excess of thirty pounds per square inch, and are afterward separated from lighter components of said high pressure distillate, by partial distillation of this latter under relatively low pressure, and are yet later distilled at decomposing temperatures under superatmospheric pressure of more than thirty pounds per square inch, the improvement which consists in subjecting residual oil from partially distilling said high pressure distillate to distillation under relatively low pressure, with collection of distillate boiling above 518° F., and in distilling this last mentioned distillate at decomposing temperatures under superatmospheric pressure of more than thirty pounds per square inch, substantially as described.

18. In the art of obtaining products from petroleum, wherein hydrocarbons boiling above 518° F. are collected in admixture with those boiling below 518° F., in the form of high pressure distillate from subjecting hydrocarbons that boil above 518° F. to distillation at decomposing temperatures under superatmospheric pressure in excess of thirty pounds per square inch, and are afterward separated from lighter components of said high pressure distillate, by partial distillation of this latter under relatively low pressure, and are yet later distilled at decomposing temperatures under superatmospheric pressure of more than thirty pounds per square inch, the improvement which comprises (1) treating said high pressure distillate with sulfuric acid, (2) separating reaction products, (3) partially distilling the acid treated oil, (4) subjecting residual oil from which lighter components have thus been separated to distillation under relatively low pressure, with collection of distillate that boils above 518° F., and (5) distilling this last mentioned distillate at decomposing temperatures under superatmospheric pressure of more than thirty pounds per square inch, substantially as described.

In testimony whereof I affix my signature.

HORACE P. CHAMBERLAIN.